United States Patent [19]
Adomeit et al.

[11] Patent Number: 6,109,649
[45] Date of Patent: Aug. 29, 2000

[54] AIRBAG MODULE

[75] Inventors: Heinz-Dieter Adomeit; Thomas Marotzke; Eleonore Braun; Harald Jahnke, all of Berlin, Germany

[73] Assignee: Petri AG, Niederlassung Berlin, Berlin, Germany

[21] Appl. No.: 08/894,388

[22] PCT Filed: Feb. 16, 1996

[86] PCT No.: PCT/DE96/00294

§ 371 Date: Feb. 2, 1998

§ 102(e) Date: Feb. 2, 1998

[87] PCT Pub. No.: WO96/25309

PCT Pub. Date: Aug. 22, 1996

[30] Foreign Application Priority Data

Feb. 17, 1995 [DE] Germany ............... 195 06 886

[51] Int. Cl.[7] ............... B60R 21/26; B60R 21/20
[52] U.S. Cl. ............... 280/740; 280/741
[58] Field of Search ............... 280/729, 736, 280/741, 742, 743.1, 740

[56] References Cited

U.S. PATENT DOCUMENTS

| 3,602,526 | 8/1971 | Brawn ............... 280/150 |
| 5,018,762 | 5/1991 | Suzuki et al. ............... 280/731 |
| 5,048,863 | 9/1991 | Henseler et al. ............... 280/743.1 |
| 5,240,282 | 8/1993 | Wehner et al. ............... 280/728.3 |
| 5,282,646 | 2/1994 | Melvin et al. ............... 280/729 |
| 5,306,042 | 4/1994 | Frank ............... 280/728.3 |
| 5,310,216 | 5/1994 | Wehner et al. ............... 280/743.1 |
| 5,382,048 | 1/1995 | Paxton et al. ............... 280/728.1 |
| 5,433,475 | 7/1995 | Kokeguchi ............... 280/736 |
| 5,458,364 | 10/1995 | Mueller et al. ............... 280/736 |

FOREIGN PATENT DOCUMENTS

| 0593010 | 4/1994 | European Pat. Off. . |
| 0620139 | 10/1994 | European Pat. Off. . |
| 0 694 446 A2 | 1/1996 | European Pat. Off. . |
| 0 698 532 | 2/1996 | European Pat. Off. . |
| 3818185 | of 0000 | Germany . |
| 1956677 | 6/1970 | Germany . |
| 4227559 | 2/1994 | Germany . |

*Primary Examiner*—Kenneth R. Rice
*Attorney, Agent, or Firm*—Christie, Parker & Hale, LLP

[57] ABSTRACT

An airbag module is provided which includes a folded gas bag, a gas generator operatively connected to the gas bag, and a gas diffusor operatively connected to the gas generator and positioned in one of the folds of the gas bag. When the gas bag deploys, it unfolds in a main unfolding direction. The gas diffusor includes large holes and a small holes for exhausting compressed gas from the gas generator into the gas bag for deployment. The large holes are located on the gas diffusor in the direction of the main unfolding direction of the gas bag.

18 Claims, 9 Drawing Sheets

PRIOR ART

AIRBAG MODULE

BACKGROUND

Gas bag systems where a cushion is automatically inflated in front of the occupant by means of a gas generator in the event of a crash are known both for the driver seat and also for the passenger seat.

In order to ensure safe protection of the occupant in the event of a vehicle crash, the gas bag has to be inflated within a short time. In practice, the inflation takes place within few milliseconds. It is thereby ensured that the gas bag is already inflated in the event of an accident before the occupant is slung towards the gas bag. It is thereby assumed that the occupant is located in a normal position predetermined by the seat so that the occupant does not impact the gas bag during inflation.

However, this case does not exist if the occupant has bent forward during vehicle impact with his head in the region of inflation for the gas bag. Then the gas bag inflated in the aforementioned short time strikes against the occupant which may injure the passenger.

In order to overcome this drawback, German Patent No. 42 27 559 discloses inflating the gas bag in the direction of the occupant (axial direction) with a comparatively slow speed, and in the sideways direction with a comparatively quick expansion speed. This device has the drawback however that if the occupant is flung forwards in the event of impact, the gas bag is still not fully inflated in the axial direction which lessens the effectiveness of the gas bag in preventing injury.

Although on the one hand it is desirable to avoid the occupant impacting the gas bag as it inflates, it is also desirable that the occupant impacts the gas bag as early as possible after its full inflation if the occupant is still located in the normal position during impact. This is not guaranteed, particularly in the case of a passenger gas bag, since the gas bag inflates in directions other than in the driver direction. The disadvantages here are that the distance between the inflated gas bag and the occupant is relatively large and that the surface of the gas bag with which the occupant comes into contact is reduced. The surface pressure on the occupant is thereby unfavorably large.

This drawback is avoided with an airbag module described in U.S. Pat. No. 5,306,042. A rotatable and displacable cover flap is provided between the gas generator and the windshield and is closed in the direction of the windshield but is open in the direction of the gas generator and vehicle occupant. The gas emerging from the gas generator first flows towards the cover flap, pressing it up to a stop position so that the deployment of the gas bag is directed toward the occupant.

The drawback with this cover flap is that it is considerably more expensive compared with other more conventional cover flaps which are formed as an integrated component part of the panel lining.

A further known possibility for influencing the expansion direction is in the use of arrester straps as described in European Patent No. 0 593 010 A1. However, sewing in arrester straps is likewise expensive.

It is therefore desirable to provide an airbag module which, in the event of impact by the vehicle, allows early contact between the gas bag and occupant with reduced surface pressure on the occupant, and without the need for more expensive designs of known airbag modules.

SUMMARY OF THE INVENTION

According to one embodiment of the invention, an airbag module is provided which includes a folded gas bag, a gas generator operatively connected to the gas bag, and a gas diffusor operatively connected to the gas generator and positioned in one of the folds of the gas bag. When the gas bag deploys, it unfolds in a main unfolding direction. The gas diffusor includes large holes and a small holes for exhausting compressed gas from the gas generator into the gas bag for deployment. The large holes are located on the gas diffusor in the direction of the main unfolding direction of the gas bag.

In another embodiment, an airbag module for the passenger seat includes a gas bag, gas generator and a gas diffusor associated therewith which is provided with different sized outlet openings. In a packed state of the airbag module, the gas bag extends in a folded state substantially laterally about the gas diffusor. With such a structural assembly, the gas bag achieves an enlarged surface expansion in the direction of the occupant.

In a preferred embodiment, the gas diffusor has enlarged outflow openings in the desired main unfolding direction of the gas bag compared to the remaining directions. Thereby, the gas bag extends in the direction of the occupant at a higher rate than in the direction of the windshield.

In a further embodiment of the invention, the gas diffusor is arranged asymmetrically relative to a tubular gas generator.

In another embodiment, the gas bag has an asymmetrical contour to facilitate the inflation of the gas bag in a preferred direction.

In another embodiment, the gas bag is folded next to the gas diffusor of a tubular gas generator asymmetrically relative thereto wherein in one gas diffusor area, which adjoins the cover flap for the gas bag, only one layer of the gas bag is provided. Furthermore, on the side of the gas diffusor on which the most folds of the gas bag are present there are larger outflow openings than on the remaining sides, more particularly on the opposite side of the diffusor. This opposite side has only one layer of the gas bag covering it. Thereby, owing to the larger outflow openings on the side where the most folds lie, the rate of the gas bag unfolding is increased in this direction.

In a further embodiment, the gas diffusor extends along the longitudinal direction of the tubular gas generator and has outflow openings of different size in this direction.

In another embodiment, only one layer of the gas bag is provided on the side of the gas diffusor which is opposite the side of the gas diffusor with the largest number of folds of the gas bag.

The directed unfolding of the gas bag is also assisted by one embodiment of the gas bag which comprises an upper part and lower part and which is turned in on the side pointing towards the occupant so that a pocket is formed. Furthermore, the upper part of the gas bag is provided with rip seams in the area of the pocket. By turning in its upper and lower sides, the extension of the gas bag in the non-inflated state is shortened. During the inflation process, the volume formed by the lower part of the pocket is inflated first and the section formed by the upper part in the area of the pocket is obstructed from unfolding by the rip seams. Instead of a vertical rising, the gas bag is deflected towards the hips of the occupant. As soon as the gas bag is well filled and the fabric tension exceeds a certain amount, the rip seams tear and the gas bag unfolds completely.

DESCRIPTION OF THE DRAWINGS

The invention will now be explained with reference to embodiments shown in the drawings in which:

FIG. 2a shows a front view of a gas diffusor according to the invention;

FIG. 2b shows a rear view of the gas diffusor of FIG. 2a;

FIG. 2c shows a cross-sectional view of the gas diffusor of FIG. 2a;

FIG. 3b shows a cross-sectional view of the airbag module of FIG. 3a;

FIG. 4b shows a longitudinal section view of the airbag module of FIG. 4a;

FIG. 5b shows a longitudinal section view of the airbag module of FIG. 5a;

DETAILED DESCRIPTION

Figure 1:
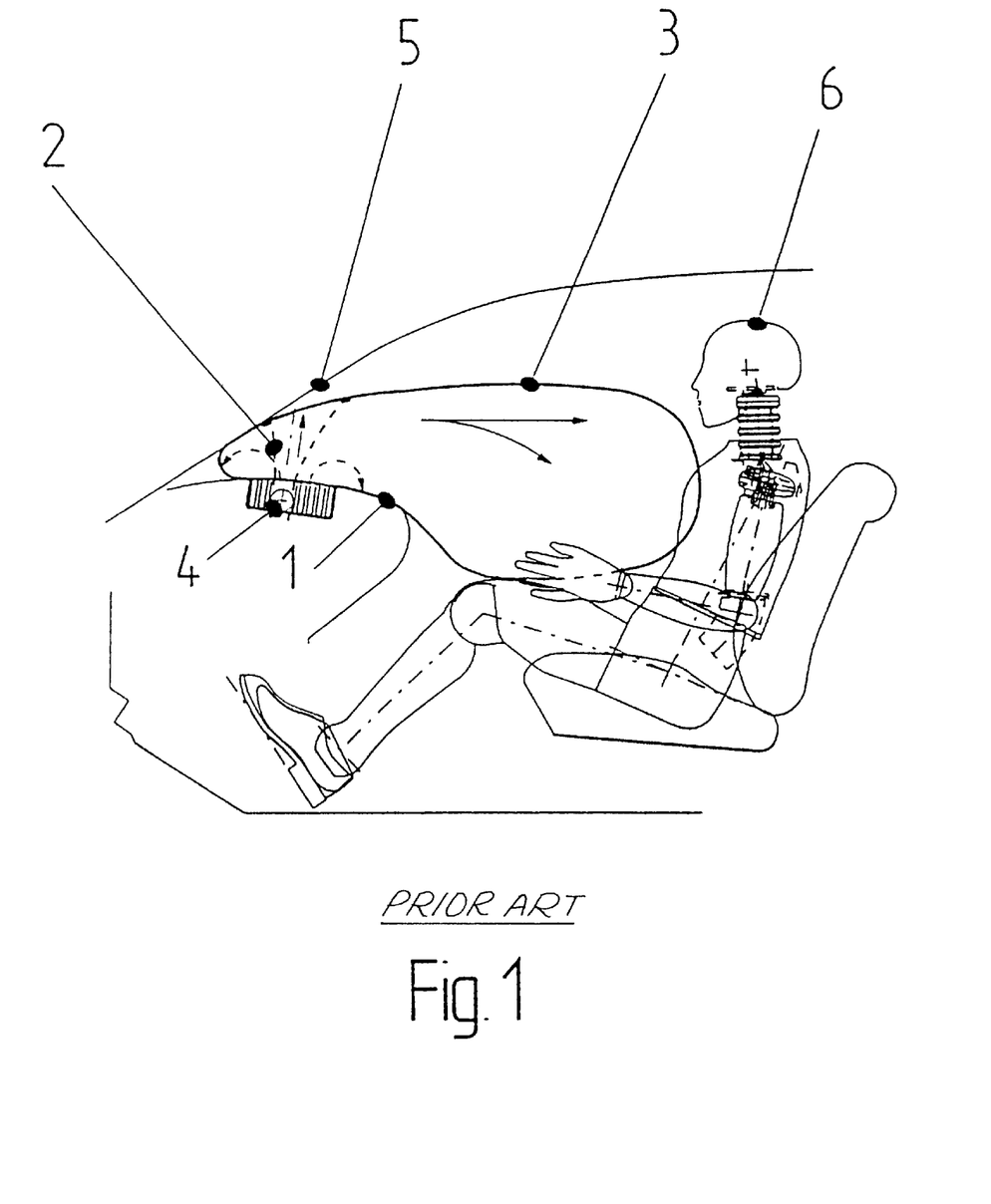
FIG. 1 shows a known arrangement of an airbag module with an arrester strap in a passenger vehicle.

FIG. 1 shows a known airbag module for a passenger seat. The arrangement in the passenger vehicle shown there is designated as "top-mounted" whereas arrangements of the passenger airbag module in the dashboard in front of the occupant are called "mid-mounted," and those towards the floor are called "low-mounted" (see FIGS. 8a–8c).

In such known airbag module, an arrester strap 2 is provided in an airbag module which is mounted underneath a dashboard 1 of the vehicle. The airbag module includes a gas bag 3 fixed to a gas generator 4. The arrester strap 2 extends across the gas bag from the area of the gas generator 4 out towards a windshield 5 of the vehicle, and during inflation of the gas bag, prevents the gas bag 3 from expanding further in the direction of the windshield 5.

By preventing the expansion of the gas bag towards the windshield 5, the arrester strap 2 causes a deflection of the gas stream in the direction of a vehicle occupant 6. The further expansion of the gas bag therefore takes place in the direction of the vehicle occupant 6. Accordingly, although the gas bag is structured symmetrically on the gas generator 4, an asymmetrical inflation takes place towards the vehicle occupant as a result of the arrester strap 2. The surface of the gas bag 3 against which the occupant 6 is flung in the event of a crash is thereby increased so that the surface pressure of the gas bag 3 on the body of the occupant is reduced. This effect is assisted still further through the support on the windshield as well as through a severely asymmetrical shape of the gas bag.

Figures 2A, 2B, 2C:
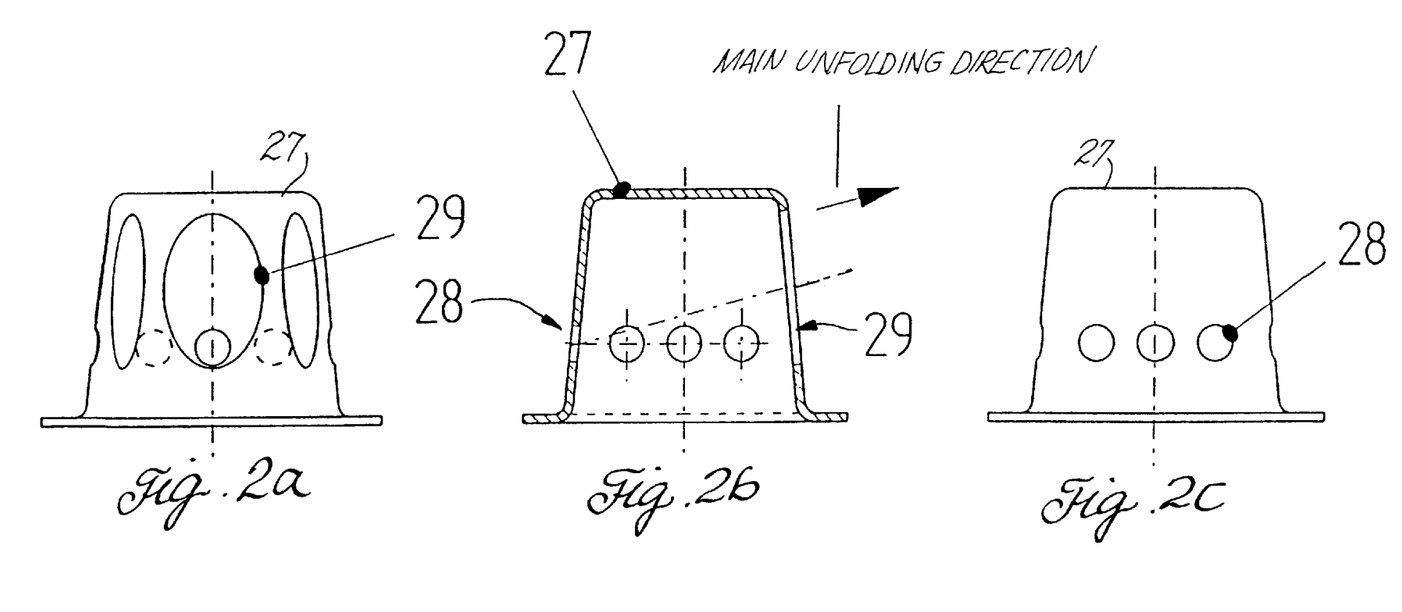

FIGS. 2a–2c illustrate a gas diffusor 27 according to one embodiment of the present invention. The diffusor 27 is provided above a housing (not shown) for a gas generator so that after ignition of the gas generator, the gas can flow out into the gas bag 41 (see FIG. 3a). The gas diffusor 27 has outflow openings 28 and 29. The outflow openings 29 in the direction of the occupant, i.e., in the proposed main unfolding direction of the gas bag, are substantially larger than the outflow openings 28 in the opposite direction or across the main unfolding direction. FIG. 2a shows the gas diffusor 27 in a view where the larger outflow openings 29 in the main unfolding direction can be seen. FIG. 2c shows a view of the gas diffusor 27 wherein the smaller outflow openings 28 provided opposite the main unfolding direction can be seen. FIG. 2b shows a central section through the diffusor 27. It can be seen that only smaller outflow openings are likewise provided across the main unfolding direction. By means of the illustrated embodiment of the gas diffusor having different sized outflow openings, the asymmetric expansion of the gas bag as shown in FIG. 1 in the direction of the occupant is achieved even without cover flaps or arrester straps.

Figure 3A:
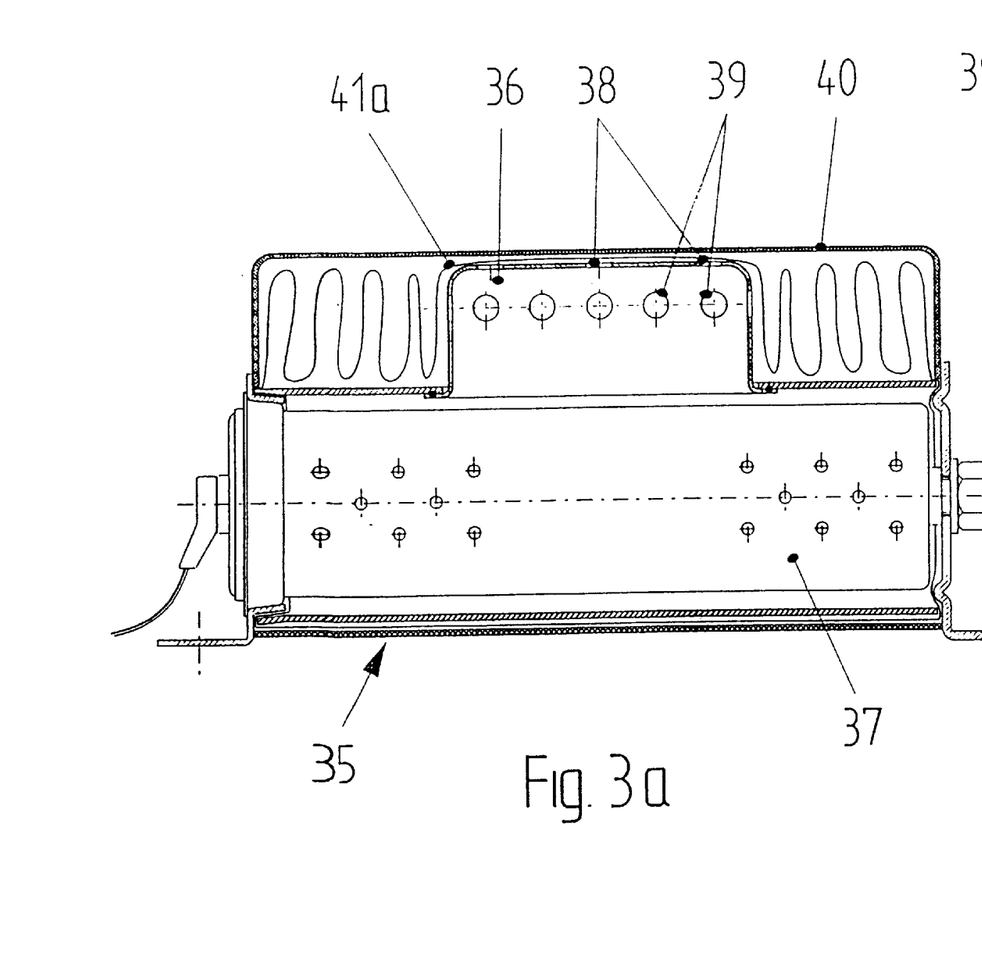
FIG. 3a shows a longitudinal section view of an airbag module with an symmetrical arrangement of the gas diffusor on the gas generator.
Figure 3B:
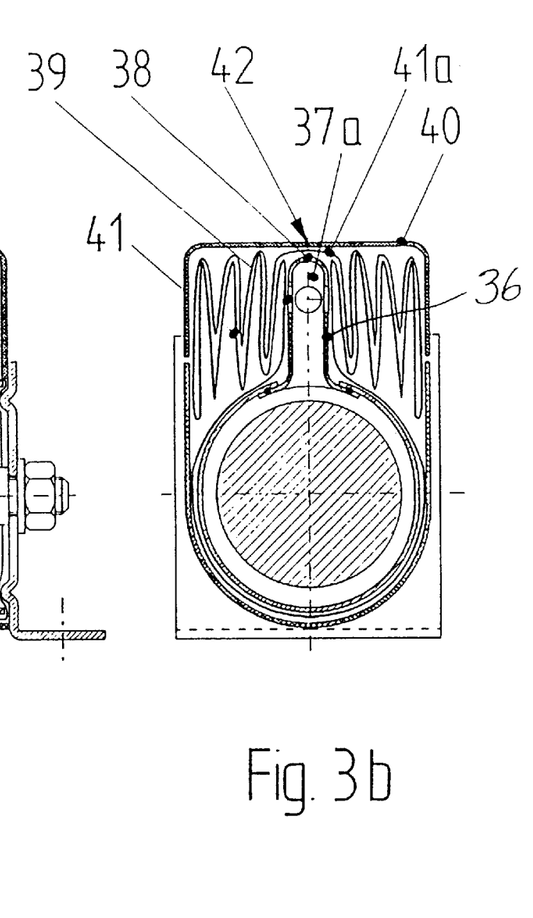

FIGS. 3a and 3b show a complete airbag module 35 according to another embodiment of the invention. Whereas the frustoconical gas diffusor shown in FIGS. 2a–2c is particularly suited for pot-shaped gas generators, FIGS. 3a and 3b show a parallelpiped shaped gas diffusor 36 in conjunction with a tubular gas generator 37. The gas diffusor 36 is arranged symmetrically on the gas generator relative to an imaginary center line 37a of the tubular gas generator 37. According to this embodiment, outflow openings 38 of the gas diffusor in the direction of a cover flap 40 of the airbag module 35 are larger than the outflow openings 39 in the direction of the gas bag 41 folded next to the gas diffusor. The gas bag is folded around the gas diffusor so that between the outflow openings 38 and the cover flap, only one layer 41a of the folded gas bag is present. In the event of inflation, this layer 41a causes the remaining gas bag folds to come out. The enlarged outflow openings 38, which lie directly underneath a rip edge 42 of the cover flap 40, cause on the one hand a more rapid ripping of the cover flap 40 during inflation of the gas bag 41, and on the other hand the rapid extension of the gas bag from the airbag module in the direction of the larger outflow openings 38.

Figure 4A:
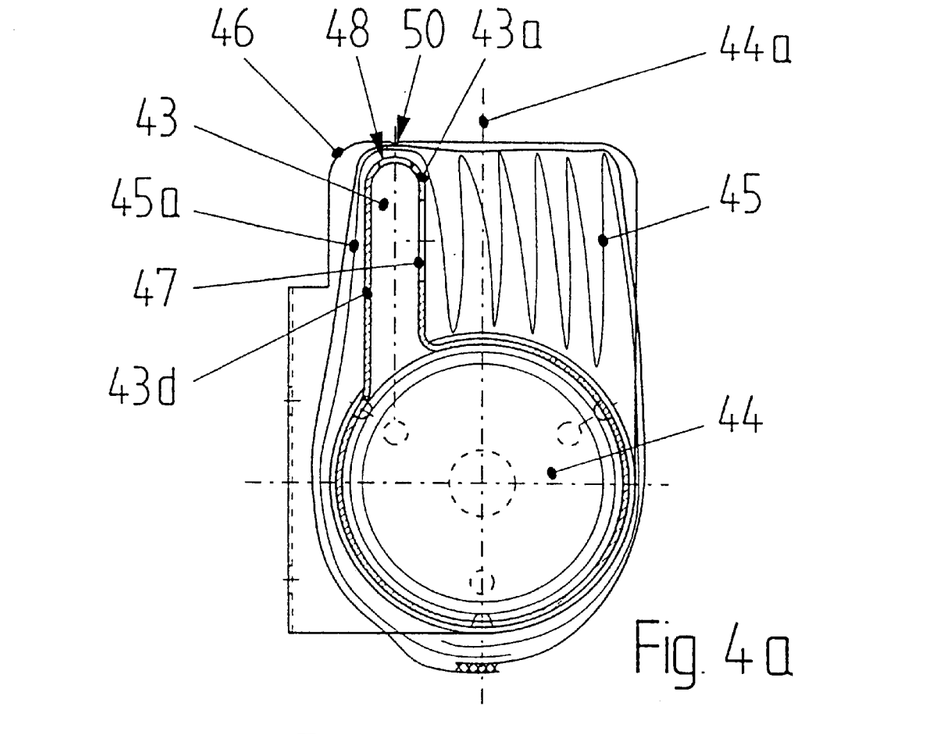
FIG. 4a shows a cross-sectional view through an airbag module with asymmetric arrangement of the gas diffusor.
Figure 4B:
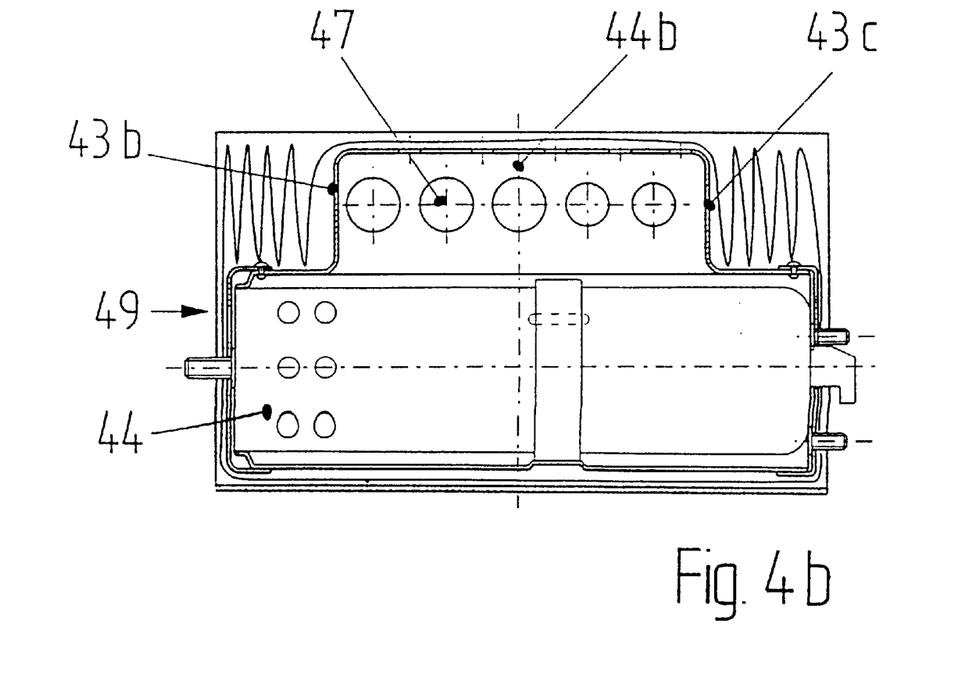

In another embodiment, shown in FIGS. 4a and 4b, a gas diffusor 43 is arranged asymmetrically relative to an imaginary center plane 44a of a tubular gas generator 44. According to this embodiment, the gas bag 45 also folds laterally around the gas diffusor. The difference in the folding compared with the embodiment shown in FIGS. 3a and 3b lies in the fact that the gas bag is folded only on one long side 43a and the two end sides 43b, 43c of the gas diffusor 43, and on the other side 43d of the gas diffusor, between the gas diffusor 43 and a cover flap 46, there is only a single layer 45a of the gas bag.

With this embodiment, outflow openings 47 of the gas diffusor are larger than outflow openings 48 in the direction of a cover flap 46 of the airbag module 49. Moreover, the larger outflow openings 47 themselves are of different sizes, as is apparent from FIG. 4b. The gas diffusor in this embodiment has no outflow openings on the side 43d.

Furthermore, with this embodiment the rip edge 50 of the cover flap 46 is arranged corresponding to the asymmetrical position of the gas diffusor 43 and is likewise asymmetrical relative to the center plane 44a of the tubular gas generator 44. During inflation of the gas bag, after the ripping of the cover flap 46, the gas bag is unfolded to a greater extent in the direction of the larger outflow openings 47, that is, asymmetrically relative to the lengthwise center plane 44a of the tubular gas generator. Owing to the different sizes of the outflow openings 47, the air bag is also unfolded asymmetrically relative to a cross-wise center plane 44b.

Figure 5A:
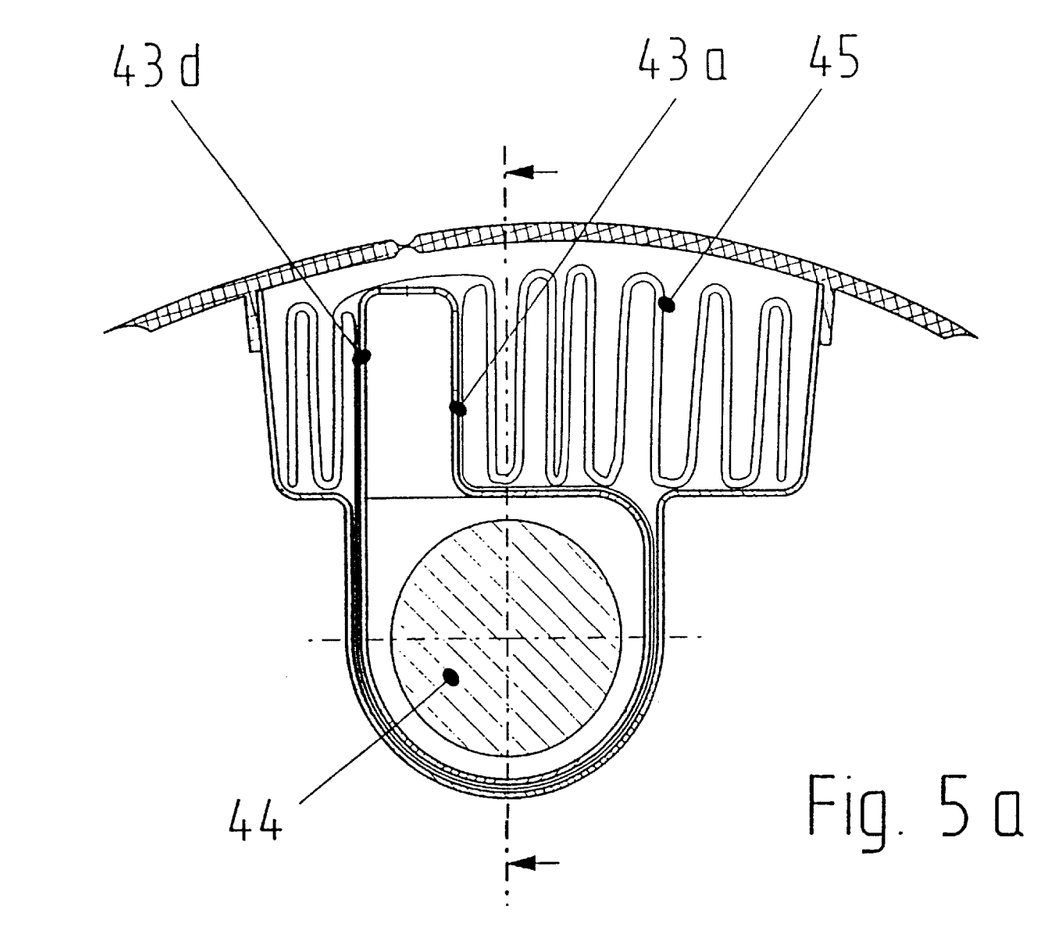
FIG. 5a shows a cross-sectional view through an airbag module with asymmetric arrangement of the gas diffusor.
Figure 5B:
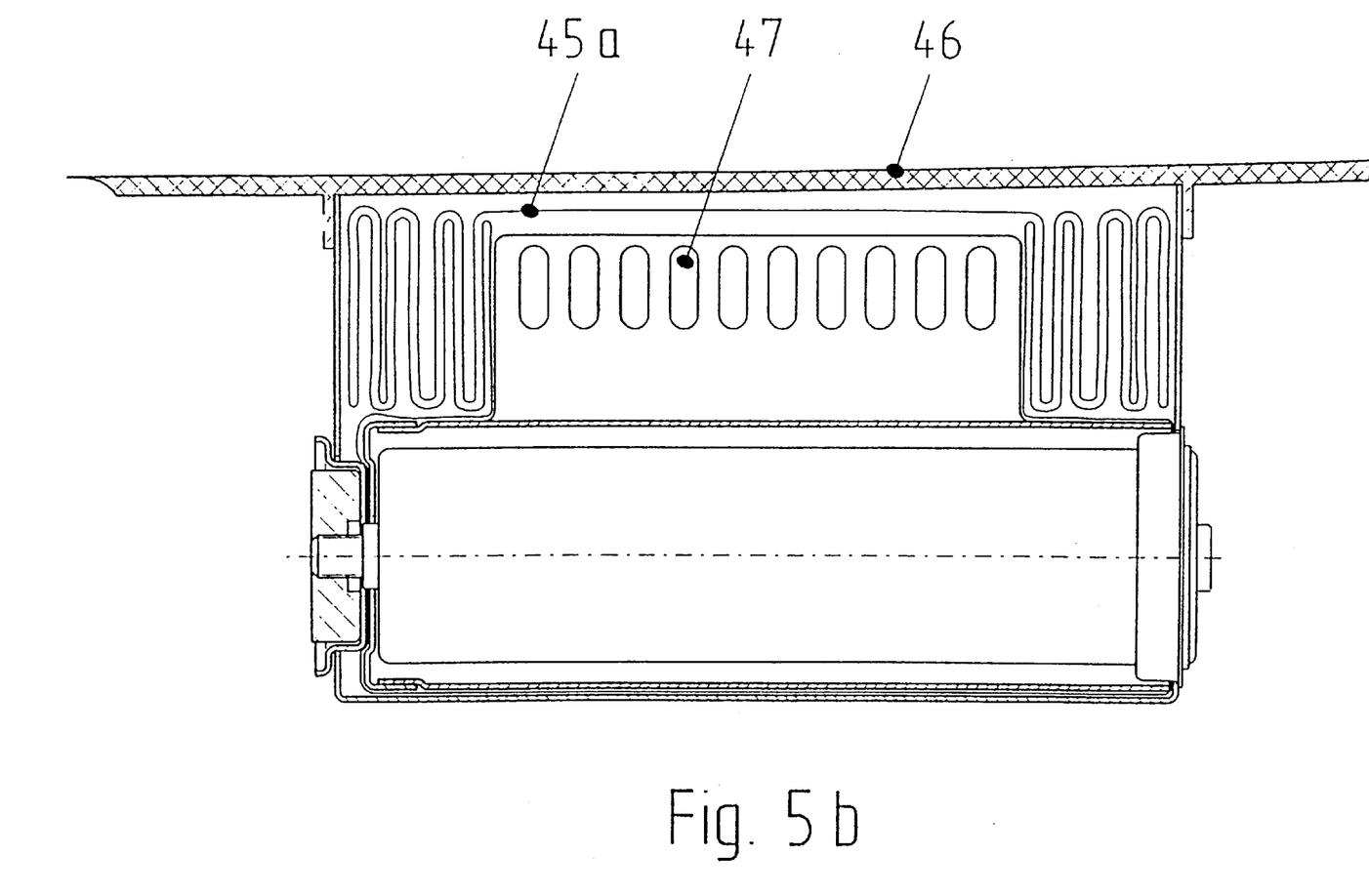

Another embodiment is shown in FIGS. 5a and 5b. This differs from the embodiment of FIGS. 4 and 4b only in that instead of the single layer 45a on the long side 43d of the gas diffusor, the gas bag is likewise folded on this side. The number of folds is however smaller than on the opposite side 43a, as is apparent from FIG. 5a. With this folding, the main unfolding direction is shifted relative to the previous embodiment.

It can be seen than the unfolding direction of the gas bag can be influenced according to the various embodiments of the invention by means of different size outflow openings in the gas diffusor and by means of the different number of folds of the gas bag on the various sides of the gas diffusor.

Figure 6:
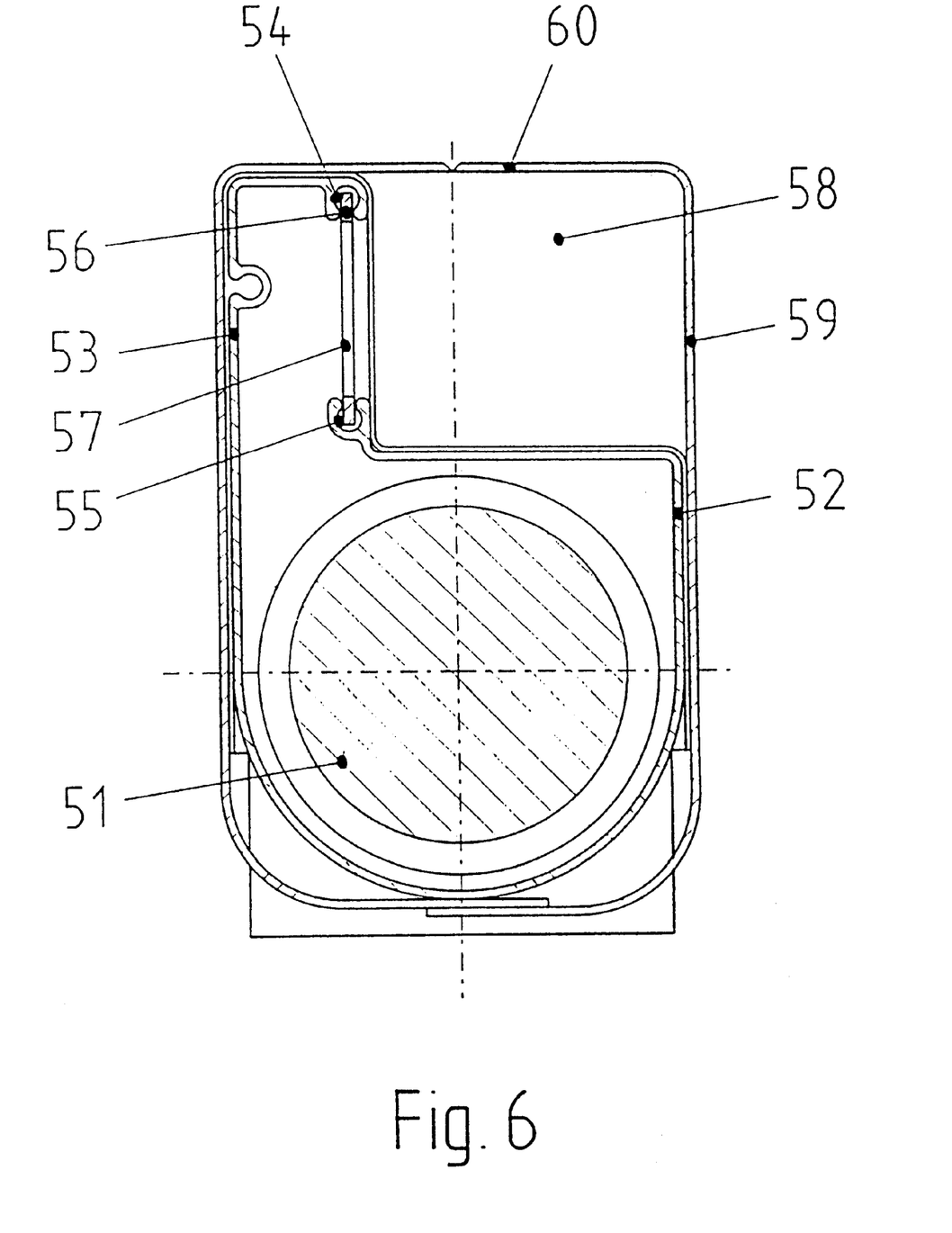
FIG. 6 shows a cross-sectional view of a housing including a diffusor.

A further embodiment of an airbag module is shown in cross-section in FIG. 6. With this embodiment, the tubular gas generator 51 is mounted on an extruded profiled section which forms both a housing 52 and a gas diffusor 53. This extruded profiled section need only be cut to the required length and closed at the ends with covers (not shown in FIG. 6). The extruded profiled section is open on one side in the area of the gas diffusor and has in this area two guide grooves 54, 55. Perforated plates 56 can be pushed into these grooves before fitting on the covers. These plates contain the outflow openings 57 of the gas diffusor. By interchanging the perforated plates, it is possible in a simple and cost-effective way to provide gas diffusors with different sized outflow openings. The tubular gas generator 51 and the enclosing housing 52 including the gas diffusor 53 are arranged in the gas bag (not shown). In this embodiment, the folds of the gas bag lie in a space 58 next to the diffusor. The entire arrangement, including the gas bag, is enclosed by a housing 59 with an integrated cover flap 60.

Figure 7A:
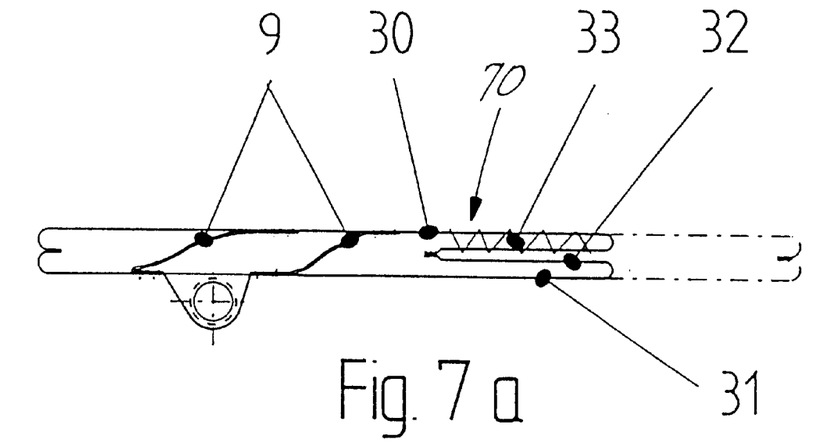
FIG. 7a shows a side view of a gas bag for a passenger airbag with controlled unfolding.
Figure 7B:
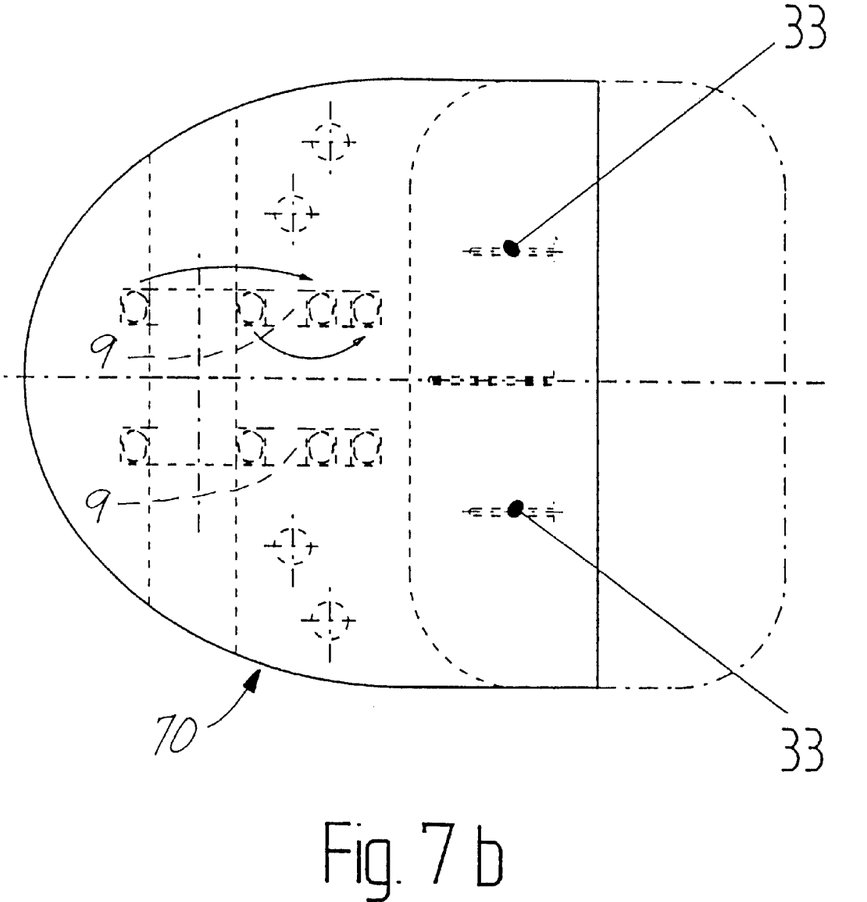
FIG. 7b shows the gas bag of FIG. 7a in plan view.

A further embodiment for controlling a gas bag unfolding process is shown in FIGS. 7a and 7b. As can be seen from FIG. 7a, the side of the gas bag 70 pointing towards the occupant is drawn inwards. The chain-dotted line shows the outlines of the gas bag prior to turning in. By turning in, the extension of the gas bag in the non-inflated state is shortened and in the turned-in area there are four layers of gas bag fabric one above the other. A pocket 32 is formed in this way between the upper part 30 and lower part 31 of the gas bag. The upper part 30 is provided with rip seams 33 in the area of the pocket 32. Arrester straps 9 are also provided.

With this embodiment, the unfolding process of the gas bag takes place so that in the shortened gas bag section, the volume formed by the lower part 31 in the area of the pocket 32, is first filled with gas. The gas bag is forced to unfold intensively in the direction of the occupant and downwards. Instead of rising vertically, the gas bag is deflected curved around the dashboard in the direction of the hips of the occupant.

As soon as the gas bag is well filled and the fabric tension exceeds a certain amount, the rip seams 33 tear open and the gas bag completely unfolds.

With the described embodiments, the gas bag reaches an enlarged surface extension in the direction of the vehicle occupants. This is achieved by a reduction of the expansion of the gas bag in directions which are less effective for the occupant in the event of impact of the vehicle, e.g., in the direction of the windshield. By increasing the surface expansion of the gas bag opposite the vehicle occupant the surface pressure in the event of impact of the occupant on the gas bag is further reduced.

Figure 8A:
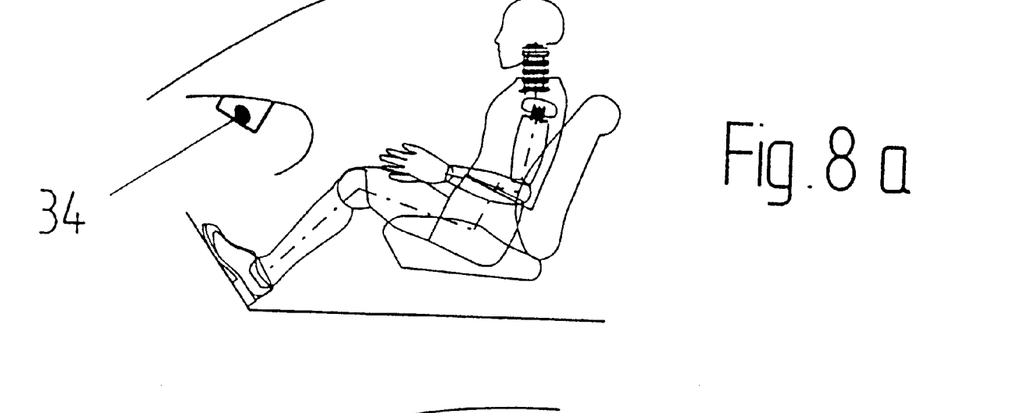
FIGS. 8a–8c show installation positions for passenger airbag modules.
Figure 8B:
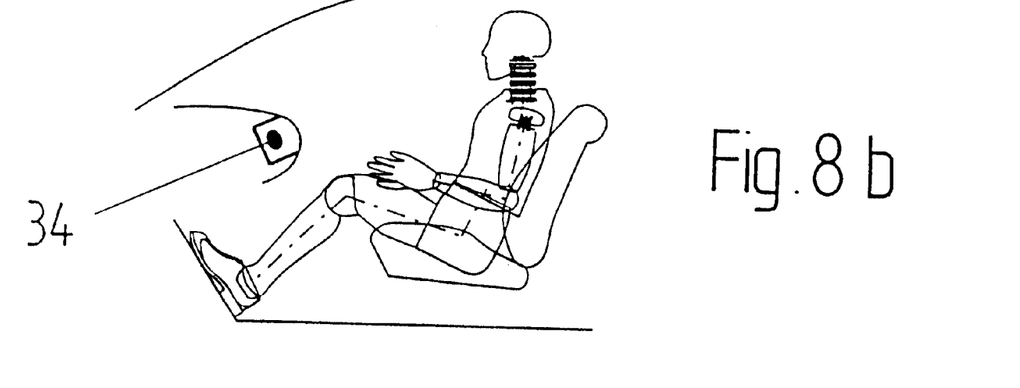
Figure 8C:
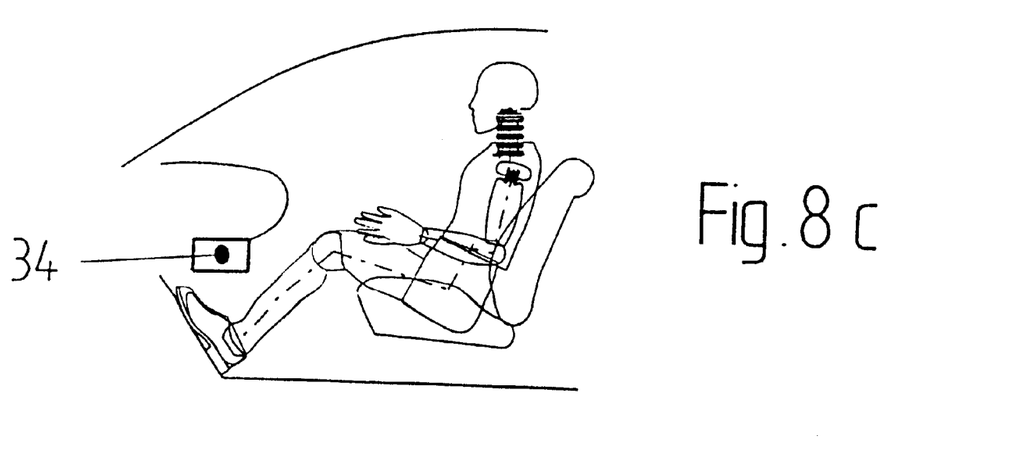

FIGS. 8a–8c show the various installation possibilities for a passenger airbag module. FIG. 8a shows the airbag module 34 in a "top-mounted" position, FIG. 8b in a "mid-mounted" position and FIG. 8c in a "low-mounted" position.

We claim:

1. Airbag module, more particularly for the passenger seat, comprising;
   a gas bag;
   a gas generator; and
   a gas diffusor associated with the gas generator wherein the gas diffusor has a sleeve portion and a diffusor portion wherein the diffusor portion projects outward from the generator a distance greater than the sleeve portion projects from the generator, the diffusor having a plurality of different sized outflow openings and wherein the gas bag extends in the folded state substantially laterally of the gas diffusor.

2. Airbag module according to claim 1 wherein the gas diffusor has outflow openings which are larger in a desired main unfolding direction of the gas bag than in other directions.

3. Airbag module according to claim 1 wherein the gas generator is a tubular gas generator having a longitudinal axis and wherein the gas diffusor is arranged asymmetrical relative to said longitudinal axis of the tubular gas generator.

4. Airbag module according to claim 1 wherein the shape of the gas bag is asymmetrical.

5. Airbag module according to claim 3 wherein the gas bag is folded next to the gas diffusor of the tubular gas generator asymmetrical relative thereto, wherein only one layer of the gas bag is provided in a gas diffusor area which adjoins a cover flap of the gas bag, wherein the gas diffusor has, on a side with the largest number of folds, larger outflow openings than in the area which is opposite the cover flap and in which there is only one layer of the gas bag.

6. Airbag module according to claim 1 wherein the gas generator comprises a tubular gas generator, wherein the gas diffusor extends in a longitudinal direction of the tubular gas generator and has outflow openings of different size in this direction.

7. Airbag module according to claim 1 wherein on the side of the gas diffusor which is opposite a side of the gas diffusor having the largest number of folds of the gas bag, there is only one layer of the gas bag.

8. An airbag module according to claim 1 wherein the gas diffusor extends chimney-like over the gas generator.

9. The airbag module according to claim 1 wherein the airbag module is a passenger-side type airbag module.

10. Airbag module comprising:
    a gas bag;
    a gas generator; and
    a gas diffusor associated with the gas generator wherein the gas bag comprises an upper part and a lower part that is turned in on a side pointing towards the occupant so that a pocket is formed between the upper part and the lower part in the gas bag, and wherein the upper part has rip seams in the area of the pocket.

11. The airbag module according to claim 10 wherein the airbag module is a passenger-side type airbag module.

12. An airbag module according to claim 10 wherein the rip seams extend through an open space within the upper part of the airbag above the area of the pocket.

13. An airbag module having a main unfolding direction comprising:
    a gas bag having a plurality of folds;
    a gas generator operatively connected to the gas bag; and
    a gas diffusor operatively connected to the gas generator and positioned in at least one of said plurality of folds of the gas bag, the gas diffusor comprising a sleeve portion and a diffusor portion wherein the diffusor portion projects outward from the generator a distance greater than the sleeve portion projects from the generator, the diffusor having a plurality of large holes and a plurality of small holes, wherein the plurality of large holes are located on the gas diffusor in the direction of the main unfolding direction.

14. The airbag module according to claim 13 wherein the airbag module is a passenger-side type airbag module.

15. The airbag module according to claim 13 wherein at least some of the plurality of large holes located on the gas diffusor in the direction of the main unfolding direction of the gas bag are differently sized.

16. The airbag module according to claim 13 further comprising a cover flap which is adjacent the gas diffuser and which covers a portion of the gas bag having the most folds, wherein only one layer of the gas bag is provided between the gas diffusor and the cover flap of the gas bag, and wherein a side of the gas diffusor adjacent the portion of the gas bag having the most folds has larger outflow openings than an opposite side of the gas diffusor, and wherein only one layer of the gas bag covers said opposite side of the gas diffusor.

17. The airbag module according to claim 13 wherein the gas diffusor is positioned asymmetrically on the gas generator and wherein a portion of the gas bag one side of the gas diffusor has more folds than a portion of the gas bag on the opposite side of the gas diffusor.

18. The airbag module according to claim 17 wherein only one layer of the gas bag covers said opposite side of the gas diffusor.

* * * * *